May 15, 1934.  O. V. MARTIN  1,958,760
MANUFACTURE OF SODIUM SULPHATE
Filed Sept. 16, 1932
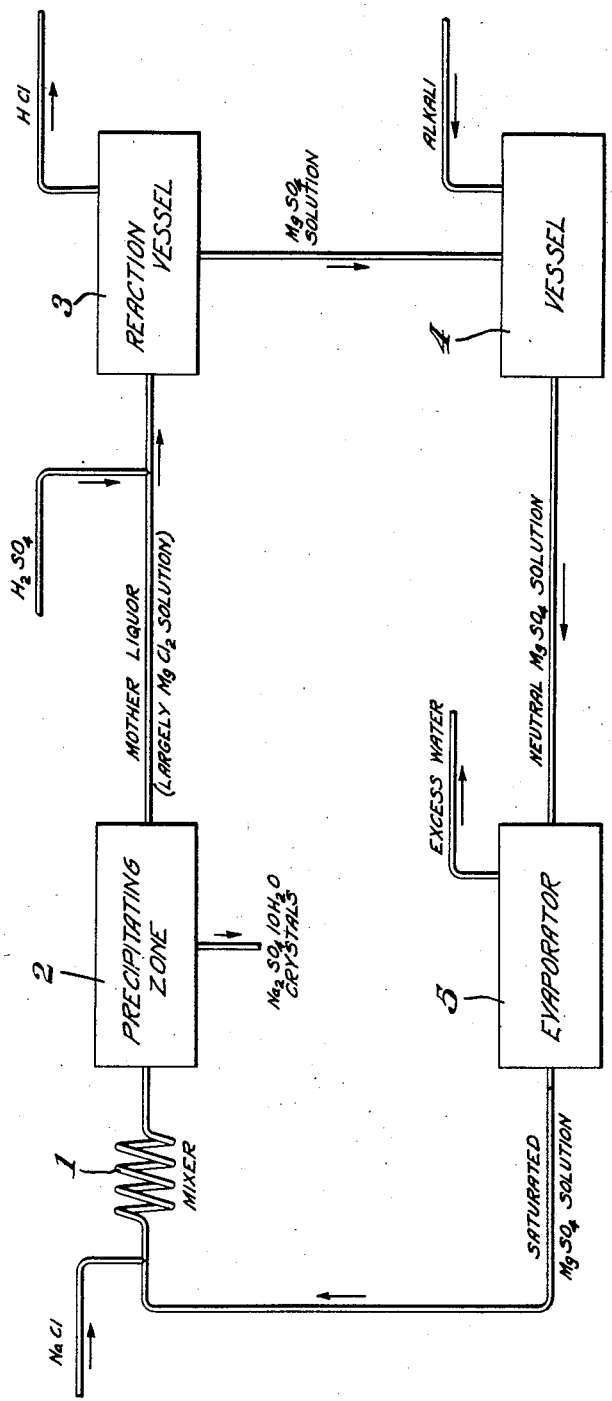
OTTO V. MARTIN
INVENTOR
BY R. J. Dearborn
HIS ATTORNEY

UNITED STATES PATENT OFFICE

1,958,760

MANUFACTURE OF SODIUM SULPHATE

Otto V. Martin, Tulsa, Okla., assignor to Texaco Salt Products Company, New York, N. Y., a corporation of Delaware Application September 16, 1932, Serial No. 633,457

4 Claims. (Cl. 23—121)

This invention relates to the manufacture of sodium sulphate.

Broadly, the invention contemplates a process of preparing sodium sulphate from sodium chloride or common salt, which comprises reacting sodium chloride with magnesium sulphate in solution to precipitate therefrom sodium sulphate and then re-forming the magnesium sulphate solution by chemically treating the mother liquor remaining after precipitation of the sodium sulphate to restore its magnesium sulphate content. The invention also contemplates the preparation of hydrogen chloride as an intermediate product during the foregoing treatment of the salt solution.

My invention provides a method of preparing sodium sulphate from sodium chloride and sulphuric acid without the necessity of employing high temperatures or rigorous heating. As practiced in the past where sodium chloride is reacted directly with sulphuric acid, rigorous heating at temperatures up to 1000° F. is necessary in order to complete the reaction. Consequently, in carrying out the reaction it is necessary to employ costly equipment capable of resisting the attack by the acid under these relatively high temperatures.

My invention comprises carrying out the process in two stages, that is, by reacting the sodium chloride with magnesium sulphate solution and cyclically re-forming the magnesium sulphate solution by treatment of the mother liquor, remaining after precipitation of the sodium sulphate, with sulphuric acid to restore dissolved magnesium salts contained therein to the sulphate form.

The treatment of the mother liquor with sulphuric acid is carried out at relatively low temperatures, around 250° F. for example, forming hydrogen chloride as an intermediate product. Rigorous and prolonged heating is unnecessary to effect this latter reaction and due to the low temperatures obtaining there is comparatively little corrosion of the equipment.

The invention is of particular advantage in connection with the utilization of common salt recovered from natural brines, particularly oil field brines or the like.

In carrying out the invention an aqueous mixture of common salt and Epsom salts may be initially used. Common salt and Epsom salts are advantageously mixed together in substantially molecular proportions to form a saturated solution. This mixture is then cooled to a temperature of around 20° F. or lower and may be held at this temperature for about 24 hours to effect precipitation of sodium sulphate in the form of Glauber's salt.

This operation may be carried out in ordinary ice plant equipment, the solution being cooled in cans such as are commonly used in the production of ice.

At the end of the precipitating period the crystals are removed and the mother liquor recovered for the subsequent treatment with acid.

The following equation is believed to illustrate the reaction between the common salt and Epsom salts to produce sodium sulphate:

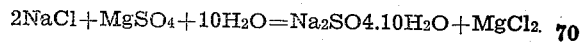

$2NaCl + MgSO_4 + 10H_2O = Na_2SO_4.10H_2O + MgCl_2.$

In balanced plant operations, the sodium chloride is mixed with magnesium sulphate solution obtained by regenerating the mother liquor in a manner which will be more fully described. Reference may be made to the accompanying flow diagram for the purpose of describing a balanced operation.

Sodium chloride is mixed in the proper proportions with regenerated magnesium sulphate solution during passage through a mixer 1. The resulting mixture is then conducted to a precipitating zone 2 wherein the mixture is cooled to around 20° F. and allowed to settle to bring about precipitation of the sodium sulphate crystals.

The mother liquor resulting from the preceding step is composed largely of magnesium chloride with small amounts of dissolved common salt, sodium sulphate and Epsom salts. This liquor is then introduced to a suitable closed vessel 3 wherein it is reacted with sulphuric acid at temperatures of around 250° F. or lower. The sulphuric acid reacts with the magnesium chloride contained in the mother liquor converting it to magnesium sulphate with the evolution of hydrogen chloride gas, which is removed from the vessel as an intermediate product.

The liquid residue remaining is composed substantially of magnesium sulphate and contains small amounts of other salts as well as traces of acid. It is preferable to undertreat the liquor with acid in order to minimize the amount of such unreacted acid.

If desired, and in order to neutralize such traces of acid, the acid treated liquor may be treated in a vessel 4 with small amounts of an alkaline material, as, for example, magnesium oxide or hydroxide, to render the liquor non-corrosive.

The resulting re-formed magnesium sulphate solution may, without further treatment, be then mixed with additional sodium chloride for the further production of Glauber's salts, while the resulting mother liquor is again recycled for treatment with acid. The sodium chloride may be mixed with the magnesium sulphate in substantially molecular proportions, altho a small excess of magnesium sulphate is desirable in the solution to produce conditions of equilibrium favorable to the carrying out of the reaction with precipitation of sodium sulphate from the mixture.

However, the mixture may be advantageously conducted to an evaporator 5 wherein it is subjected to evaporation for the purpose of removing excess water and thus forming a saturated solution from which the Glauber's salt is precipitated upon cooling. If desired this evaporation may be carried out by spraying the warmed mixture into the atmosphere as described, for example, in my pending application Serial No. 475,270, for the "Recovery of salts and other products from oil field brines" filed August 14, 1930. The saturated magnesium sulphate solution is then conducted to the mixer 1 wherein it is reacted with further sodium chloride.

Where magnesium oxide is being continually introduced to the magnesium sulphate solution for neutralization there is a gradual accumulation of magnesium salt in the system. In order to maintain a proper balance a certain amount of magnesium may be removed either from the pond as magnesium chloride solution contaminated with small amounts of other dissolved salts, or from the neutralized acid treated solution as magnesium sulphate contaminated with small amounts of other compounds. This drawn-off material composed of around 98% of magnesium salts may be disposed of either for use in the stucco industry or for further treatment for the preparation of other products therefrom.

The crystals of sodium sulphate containing 10 molecules of water as produced in the foregoing process may be disposed of as such after drying or draining in any suitable manner, or they may be subjected to dehydration for the production of anhydrous salt. The dehydration may be effected by heating and dissolving the crystals in their own water of dehydration and salting out by the addition thereto of common salt. It is not essential that this particular method be followed since other means may be adopted for preparing the anhydrous salt such as by exposing the hydrated salt to sufficiently high temperatures to remove water of crystallization.

Obviously many modifications and variations of the invention, as hereinbefore, set forth, may be made without departure from the spirit and scope thereof, and therefore only such limitations should be imposed as are indicated in the appended claims.

I claim:—

1. The cyclical process of preparing sodium sulphate from sodium chloride which comprises reacting sodium chloride with magnesium sulphate solution to precipitate sodium sulphate, removing the precipitated sodium sulphate, reacting the remaining mother liquor with sulphuric acid at a temperature up to about 250° F. to restore its magnesium sulphate content, and reacting it with fresh sodium chloride for the production of further sodium sulphate.

2. The method of preparing sodium sulphate and hydrogen chloride from sodium chloride comprising initially mixing sodium chloride and Epsom salts in substantially molecular proportions to form a saturated solution, cooling the solution to precipitate sodium sulphate, removing the precipitated sodium sulphate, treating the mother liquor with sulphuric acid to produce hydrogen chloride and form a solution composed substantially of magnesium sulphate, and returning the solution for reaction with further sodium chloride.

3. The method of preparing sodium sulphate and hydrogen chloride from sodium chloride comprising initially mixing sodium chloride and Epsom salts in substantially molecular proportions to form a saturated solution, cooling the solution to precipitate sodium sulphate, removing the precipitated sodium sulphate, reacting the mother liquor with sulphuric acid to evolve hydrogen chloride and produce a solution composed substantially of magnesium sulphate, neutralizing the acid treated solution with alkaline material, and reacting the neutralized solution with additional sodium chloride to produce further sodium sulphate.

4. The process of preparing sodium sulphate from sodium chloride comprising mixing sodium chloride with magnesium sulphate in solution and in substantially molecular proportions to form a saturated solution, cooling the solution to around 20–24° F., maintaining the solution at that temperature for a prolonged period of time to precipitate sodium sulphate, removing the precipitated sodium sulphate, in crystal form, reacting the remaining mother liquor with sulfuric acid at a temperature of about 250° F., or below, whereby a solution composed substantially of magnesium sulphate is formed, reacting the resulting solution with fresh sodium chloride for the production of further sodium sulphate crystals, and cyclically reforming magnesium sulphate solution from the resulting mother liquor.

OTTO V. MARTIN.